United States Patent
Lee et al.

(10) Patent No.: US 9,432,655 B2
(45) Date of Patent: Aug. 30, 2016

(54) THREE-DIMENSIONAL SCANNER BASED ON CONTOURS FROM SHADOW IMAGES

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Yang-Teh Lee, New Taipei (TW); Kwan Ho, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 311 days.

(21) Appl. No.: 14/156,481

(22) Filed: Jan. 16, 2014

(65) Prior Publication Data

US 2015/0054918 A1 Feb. 26, 2015

Related U.S. Application Data

(60) Provisional application No. 61/869,079, filed on Aug. 23, 2013.

(30) Foreign Application Priority Data

Oct. 18, 2013 (TW) .............................. 102137783 A

(51) Int. Cl.
*H04N 13/02* (2006.01)
*G01B 11/25* (2006.01)

(52) U.S. Cl.
CPC ....... *H04N 13/0253* (2013.01); *G01B 11/2522* (2013.01); *G01B 11/2545* (2013.01); *H04N 13/0221* (2013.01)

(58) Field of Classification Search
CPC ..................... H04N 13/0253; H04N 13/0221; G01B 11/2522; G01B 11/2545
See application file for complete search history.

(56) References Cited

U.S. PATENT DOCUMENTS 4,957,369 A * 9/1990 Antonsson ......... G01B 11/2545
356/3.08
5,678,089 A 10/1997 Bacs, Jr. et al.
(Continued)

FOREIGN PATENT DOCUMENTS

JP 08-105724 4/1996
JP 2001148021 5/2001
(Continued)

OTHER PUBLICATIONS

"Office Action of Japan Counterpart Application", issued on Jul. 17, 2015, p. 1-p. 4.
(Continued)

*Primary Examiner* — Jay Patel
*Assistant Examiner* — Joseph Suh
(74) *Attorney, Agent, or Firm* — Jianq Chyun IP Office

(57) ABSTRACT

A three-dimensional (3D) scanner including a light-source module, a screen, a rotary platform, an image capturing unit and a process unit is provided. The light source module is configured to emit a beam. The screen disposed on a transmission path of the beam has a projection surface facing the light source module. The rotary platform carrying a 3D object is disposed between the light source module and the screen. The 3D object is rotated to a plurality of object orientations about a rotating axis to form a plurality of object shadows on the projection surface. The image capturing unit is configured to capture the object shadows from the projection surface to obtain a plurality of object contour images. The process unit is configured to read and process the object contour images to build the digital 3D model related to the 3D object according to the object contour images.

10 Claims, 5 Drawing Sheets

(56) References Cited

U.S. PATENT DOCUMENTS

| | | | |
|---|---|---|---|
| 5,747,822 A | 5/1998 | Sinclair et al. | |
| 6,195,151 B1* | 2/2001 | Parthasarathy | B41J 3/60 346/134 |
| 6,317,481 B1* | 11/2001 | Berestov | A61B 6/022 348/E13.008 |
| 7,336,767 B1* | 2/2008 | Le | G01N 23/04 250/363.1 |
| 2001/0005204 A1* | 6/2001 | Matsumoto | G06T 15/04 345/418 |
| 2001/0046033 A1 | 11/2001 | Troyer | |
| 2002/0031265 A1* | 3/2002 | Higaki | G06K 9/48 382/199 |
| 2002/0050988 A1* | 5/2002 | Petrov | G06K 9/20 345/418 |
| 2002/0054662 A1* | 5/2002 | Verdonck | A61B 6/4441 378/62 |
| 2002/0105513 A1* | 8/2002 | Chen | G06T 1/0007 345/419 |
| 2002/0193975 A1* | 12/2002 | Zimmerman | G09B 9/00 703/6 |
| 2005/0195368 A1* | 9/2005 | Bissinger | A63J 5/021 353/10 |
| 2006/0188170 A1* | 8/2006 | Kanda | G06K 9/033 382/255 |
| 2006/0217832 A1* | 9/2006 | Videcoq | B24B 9/148 700/164 |
| 2007/0062271 A1* | 3/2007 | Vassard | G05B 19/401 73/152.01 |
| 2008/0037703 A1* | 2/2008 | Ting | A61B 6/466 378/37 |
| 2008/0100806 A1* | 5/2008 | Inazumi | G09G 3/001 353/31 |
| 2008/0204579 A1* | 8/2008 | Masuda | G06T 7/0085 348/254 |
| 2008/0246757 A1* | 10/2008 | Ito | G06T 15/10 345/419 |
| 2009/0273792 A1* | 11/2009 | Hullin | G01B 11/2504 356/601 |
| 2011/0050859 A1* | 3/2011 | Kimmel | G01B 11/2509 348/50 |
| 2012/0274745 A1* | 11/2012 | Russell | H04N 13/025 348/46 |
| 2014/0002610 A1* | 1/2014 | Xi | G01B 11/2513 348/46 |
| 2014/0022253 A1* | 1/2014 | Nakagawa | G06T 7/0032 345/427 |

FOREIGN PATENT DOCUMENTS

| | | |
|---|---|---|
| JP | 2001243468 | 9/2001 |
| JP | 2003279328 | 10/2003 |
| JP | 2008017386 | 1/2008 |
| JP | 2010025927 | 2/2010 |
| TW | M429122 | 5/2012 |

OTHER PUBLICATIONS

"Office Action of Taiwan Counterpart Application", issued on Feb. 13, 2015, p. 1-p. 6.

* cited by examiner

THREE-DIMENSIONAL SCANNER BASED ON CONTOURS FROM SHADOW IMAGES

CROSS-REFERENCE TO RELATED APPLICATION

This application claims the priority benefits of U.S. provisional application Ser. No. 61/869,079, filed on Aug. 23, 2013 and Taiwan application serial no. 102137783, filed on Oct. 18, 2013. The entirety of each of the above-mentioned patent applications is hereby incorporated by reference herein and made a part of this specification.

BACKGROUND

1. Technical Field

The invention relates to a scanner. Particularly, the invention relates to a three-dimensional scanner.

2. Related Art

Along with progress of computer technology and development of multimedia technology, computers have gradually become indispensable tools in people's daily life, and rapid development of image processing technique leads to progress of computer peripheral image processors, for example, three-dimensional (3D) scanners.

Generally, a 3D scanner is an instrument used for detecting and analysing shapes (geometric structures), and appearance information (for example, color, surface reflectance, etc.) of objects or environment in the real world, and the collected data is usually used in 3D reconstruction calculation, so as to build digital models of physical objects in a virtual world. Theses digital models have a very wide range of application, and can be applied in, for example, industrial design, defect detection, reverse engineering, robot guidance, topography measurement, medical information, biological information, criminal identification, digital antique collection, film production, game creation material, 3D printing, etc.

A conventional 3D scanner generally uses at least two cameras to capture a plurality of color images of an object to be reconstructed, and image processing software is used to process the color images to construct a digital 3D model. Conceptually, such method is similar to that a human being deduces an image depth according to superposition of images sensed by the two eyes, and if a space between the cameras and focal lengths thereof are known, and the captured images can be successfully superposed, the depth information can be quickly deduced. Such method relies on effective correspondence analysis of image pixels, which is generally implemented by using a block matching method or an epipolar geometry algorithm, where a 3D vision method that applies two cameras is also referred to as a binocular method, and there is a trinocular method and other extending methods that apply more cameras. However, such 3D scanner is complicated in image processing and calculation for building a digital 3D model, and a cost thereof cannot be effectively reduced.

SUMMARY

Accordingly, the invention is directed to a three-dimensional (3D) scanner, which has a simple component configuration, a higher efficiency in building of a digital 3D model and low cost.

The invention provides a 3D scanner, which is capable of building a digital 3D model related to a 3D object. The 3D scanner includes a light source module, a screen, a rotary platform, an image capturing unit and a processing unit. The light source module is configured to emit a beam. The screen is disposed on a transmission path of the beam and has a projection surface facing the light source module. The rotary platform is configured to carry the 3D object and is disposed between the light source module and the screen. The rotary platform is adapted to rotate the 3D object to a plurality of orientations about a rotating axis, so as to form a plurality of object shadows of the 3D object respectively corresponding to the orientations on the projection surface of the screen. The image capturing unit is configured to capture the object shadows from the projection surface of the screen to obtain a plurality of object contour images. The processing unit is coupled to the image capturing unit, and is configured to read and process the object contour images to build the digital 3D model related to the 3D object according to the object contour images.

The invention provides a 3D scanner, which is adapted to build a digital 3D model related to a 3D object. The 3D scanner includes a light source module, a rotary platform, at least one image capturing unit and a processing unit. The light source module is configured to emit a plurality of beams to form a planar lighting curtain. The rotary platform is configured to carry the 3D object, and the 3D object is disposed on a transmission path of the planar lighting curtain. The rotary platform is adapted to rotate the 3D object to a plurality of orientations about a rotating axis, and the planar lighting curtain forms a plurality of light contours respectively corresponding to the orientations on a surface of the 3D object. The image capturing unit is configured to capture the light contours to obtain a plurality of light contour images. The processing unit is coupled to the image capturing unit, and is configured to read and process the light contour images to build the digital 3D model related to the 3D object according to the light contour images.

According to the above descriptions, the 3D object is disposed on the rotary platform of the 3D scanner, and when the 3D object is rotated, the light source irradiates the 3D object to project the shadow of the 3D object onto the screen, or a collimated light source irradiates the 3D object to directly form a light contour on the surface of the 3D object to obtain contours of the 3D object from different angles, and the image capturing unit is used to capture the contour images of different angles, and then the processing unit is used to build a digital 3D model related to the 3D object according to the contour images. In this way, since the processing unit is only required to process the contour information of the 3D object, a loading of the processing unit in performing image processing and calculation is greatly mitigated, and efficiency for the 3D scanner building the digital 3D model is improved. Moreover, component configuration of the 3D scanner is rather simple, so that a production cost is reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention. Moreover, in the following embodiments, the same or similar reference numbers denote the same or like components.

Figure 1:
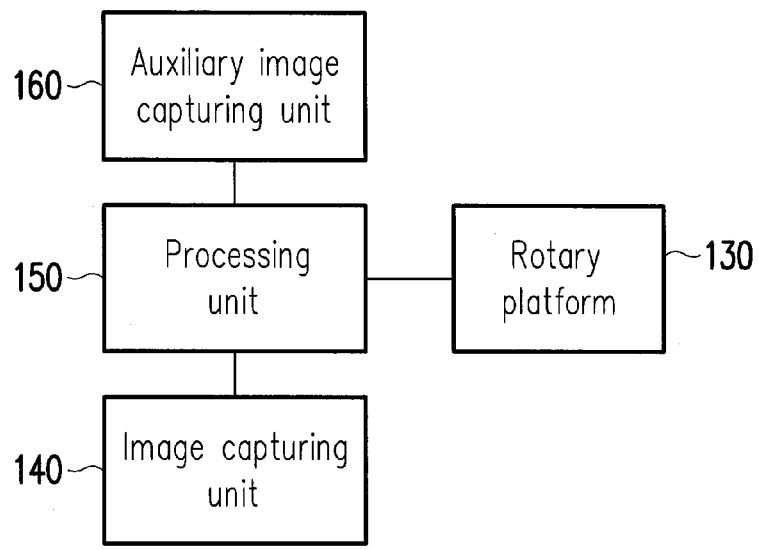
FIG. 1 is a partial block schematic diagram of a three-dimensional (3D) scanner according to an embodiment of the invention.
Figure 2:
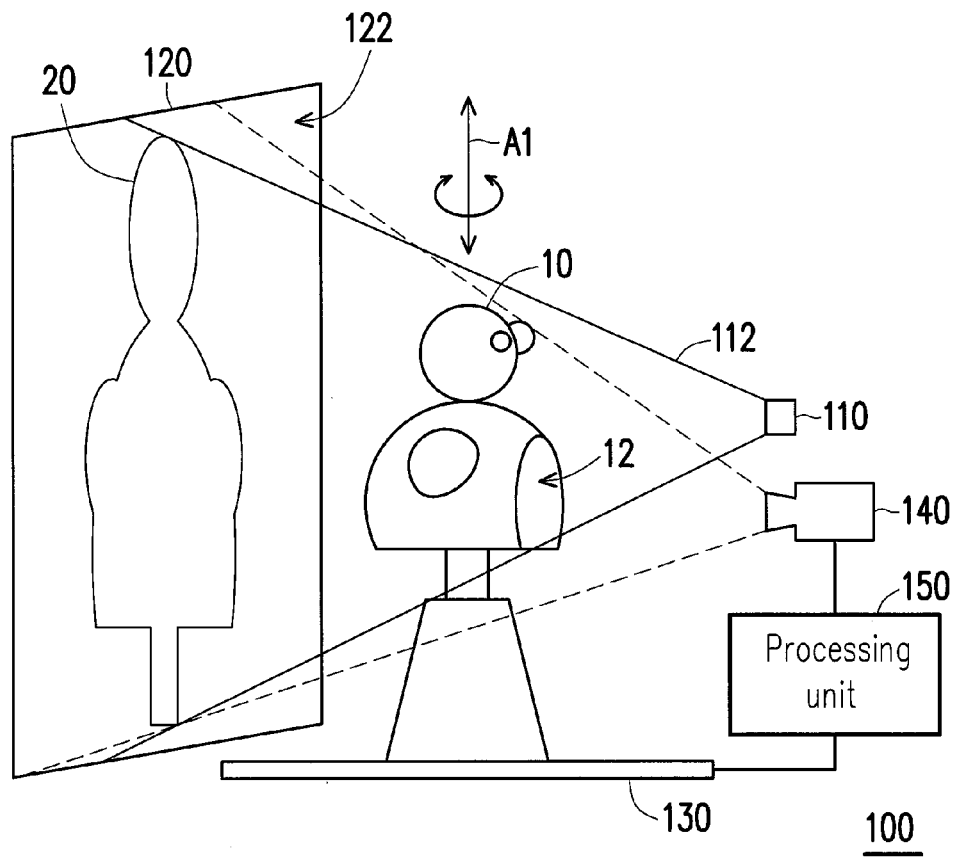
FIG. 2 is a schematic diagram of a 3D scanner according to an embodiment of the invention.

FIG. 1 is a partial block schematic diagram of a three-dimensional (3D) scanner according to an embodiment of the invention. FIG. 2 is a schematic diagram of a 3D scanner according to an embodiment of the invention. Referring to FIG. 1 and FIG. 2, in the present embodiment, the 3D scanner 100 performs a 3D model construction on a 3D object 10 to build a digital 3D model related to the 3D object 10. The 3D scanner 100 is, for example, coupled to a 3D printing apparatus, and the 3D printing apparatus reads the digital 3D model and builds a duplicate of the 3D object 10 according to the digital 3D model. The 3D scanner 100 of the present embodiment includes a light source module 110, a screen 120, a rotary platform 130, an image capturing unit 140 and a processing unit 150. The light source module 110 is configured to emit a beam 112. In the present embodiment, the light source module 110 adopts a light-emitting diode (LED) light source. The screen 120 has a projection surface 122 facing the light source module 110, and is disposed on a transmission path of the beam 112. Here, the 3D object 10 shadows the screen 120, so as to form an object shadow 20 on the projection surface 122, where the relation between a size of the object shadow 20 and a size of the 3D object 10 is in a fixed ratio. In the present embodiment, the fixed ratio may be substantially greater than 1. Namely, the size of the object shadow 20 may be proportionally greater than the size of the 3D object 10. The 3D scanner 100 may control the size ratio between the object shadow 20 and the 3D object 10 by adjusting a distance between the light source module 110 and the 3D object and a distance between the 3D object 10 and the screen 120, so as to form the object shadow 20 on the screen 120, where the size of the object shadow 20 is proportionally greater than that of the 3D object 10, and accordingly obtain more detailed object contour images.

The rotary platform 130 is configured to carry the 3D object 10, and is disposed between the light source module 110 and the screen 120, such that the 3D object 10 is located on the transmission path of the beam 112 and blocks the transmission of the beam 112. The beam 112 emitted by the light source module 110 has a stable brightness. Therefore, when the beam 112 emitted by the light source module 110 irradiates the 3D object 10, an object shadow 20 with a clear contrast is formed on the screen 120 in the back. It should be noticed that the light source module 110, the screen 120 and the rotary platform 130 in the 3D scanner 100 are arranged along a straight line, though the invention is not limited thereto. In other embodiments, the above components can be arranged in a non-linear relationship. For example, the above components can be arranged in a way of reflection and or may have included angles therebetween, etc. Moreover, distances between the light source module 110, the screen 120 and the rotary platform 130 in the 3D scanner 100 can be adjusted according to the size of the 3D object 10, a size of a lens aperture of the image capturing unit 140 and a requirement of image resolution, so as to build a more precise digital 3D model.

The rotary platform 130 is adapted to rotate the 3D object 10 to a plurality of orientations about a rotating axis A1, and the 3D object 10 is irradiated by the beam 112 to form a plurality of object shadows 20 respectively corresponding to the orientations on the screen 120. While the rotary platform 130 rotates the 3D object 10, the image capturing unit 140 is configured to capture the object shadows 20 from the projection surface 122 of the screen 120. Where, the images generated by the image capturing unit 140 capturing the object shadows 20 are defined as "object contour images". In the present embodiment, the image capturing unit 140 may be a camera using a charge coupled device (CCD) lens for capturing the object shadows 20 to obtain a plurality of object contour images. Of course, the invention is not limited thereto.

The processing unit 150 is coupled to the image capturing unit 140, and is configured to read and process the object contour images to build the digital 3D model related to the 3D object 10 according to the object contour images. In the present embodiment, the image capturing unit 140 is, for example, a monochromatic image capturing unit, i.e. the obtained object contour image is a black-and-white image, so as to mitigate loading of the processing unit 150 in performing image processing and calculation. The processing unit 150 may further obtain a corresponding object contour line according to a maximum grey level difference of each of the object contour images, and built the digital 3D model according to the object contour lines.

In the present embodiment, the processing unit 150 may include a memory and a processor. The memory is configured to store the object contour images captured by the image capturing unit 140, and the processor configured to process the object contour images stored in the memory to build the digital 3D model related to the 3D object 10. Moreover, in other embodiments of the invention, the image capturing unit 140 and the processing unit 150 can be integrated to a single device, for example, a personal computer (PC) having a camera or video camera function, a notebook computer, a smart phone and a tablet PC, etc., though the invention is not limited thereto. Moreover, the image capturing unit 140 may transmit the captured object contour images to the processing unit 150 through cable or wireless.

In detail, the processing unit 150 is further coupled to the rotary platform 130, and controls the rotary platform 130 to rotate the 3D object 10 to a plurality of orientations about the rotating axis A1. Further, the processing unit 150 may control the rotary platform 130 to rotate a plurality of predetermined angles about the rotating axis A1 sequentially, so as to rotate the 3D object 10 to the aforementioned orientations. Moreover, in the present embodiment, the rotary platform 130, for example, has an encoder configured to record the orientations of the rotary platform 130 for the processing unit 150 to read the recorded orientations. In this way, each time when the rotary platform 130 rotates the 3D object 10 by a predetermined angle, the image capturing unit 140 captures the object contour image of the object shadow 20 from the screen 120. The above step is repeated to obtain the object contour images of the 3D object 10 at various angles, and the processing unit 150 is used to convert the object contour images into the object contour lines in plane coordinates, and correspond the object contour lines to the coordinates of the orientations, so as to build the digital 3D model related to the 3D object 10.

In the present embodiment, a sum of the predetermined angles by which the processing unit 150 controls the rotary platform 130 to rotate about the rotating axis A1 is 180 degrees. Namely, each time the rotary platform 130 rotates the 3D object 10 by the predetermined angle until the 3D object 10 is totally rotated by 180 degrees. It should be noticed that a magnitude of the predetermined angle of each rotation of the rotary platform 130 is determined by a complexity of a surface contour of the 3D object 10. When the surface contour of the 3D object 10 is more complicated, the magnitude of the predetermined angle of each rotation of the rotary platform 130 may be smaller, namely, the image capturing unit 140 generates more object contour images.

Generally, when the 3D object 10 is placed, the 3D object 10 is ideally placed at a center of the rotary platform 130, so that a central axis of the 3D object 10 substantially coincides with the rotating axis A1 of the rotary platform 130. Therefore, theoretically, an initial object contour image of the 3D object 10 corresponding to an initial orientation of the rotary platform 130 substantially coincides with a final object contour image of the 3D object 10 corresponding to a final orientation rotated by 180 degrees.

However, in an actual application, placement of the 3D object 10 may have deviation, such that the central axis of the 3D object 10 does not coincide with the rotating axis A1 of the rotary platform 130. Therefore, the initial object contour image corresponding to the initial orientation of the 3D object 10 on the rotary platform 130 cannot substantially coincide with the final object contour image of the 3D object 10 corresponding to the final orientation on the rotary platform 130 rotated by 180 degrees. In this case, the processing unit 150 can compare the initial object contour image with the final object contour image to obtain a real object contour image of the 3D object 10 in such orientation, and obtain a real central axis of the object contour images.

Besides, if the 3D object 10 has a recess portion 12 recessed towards the central axis of the 3D object 10, the image capturing unit 140 may further capture a grey level image of the recess portion 12, and the processing unit 150 reads and processes the grey level image, and builds a digital 3D model related to the 3D object 10 having the recess portion 12 according to the object contour images and the grey level image. In detail, when the 3D object 10 is rotated to a position where the recess portion 12 faces to the image capturing unit 140, the processing unit 150 controls the image capturing unit 140 to capture the grey level image of the recess portion 12, and the processing unit 150 can deduce the structure information of the recess portion 12, and build the digital 3D model related to the 3D object 10 having the recess portion 12 according to the object contour images of the 3D object 10 in different angles and the grey level image of the recess portion 12.

Figure 3:
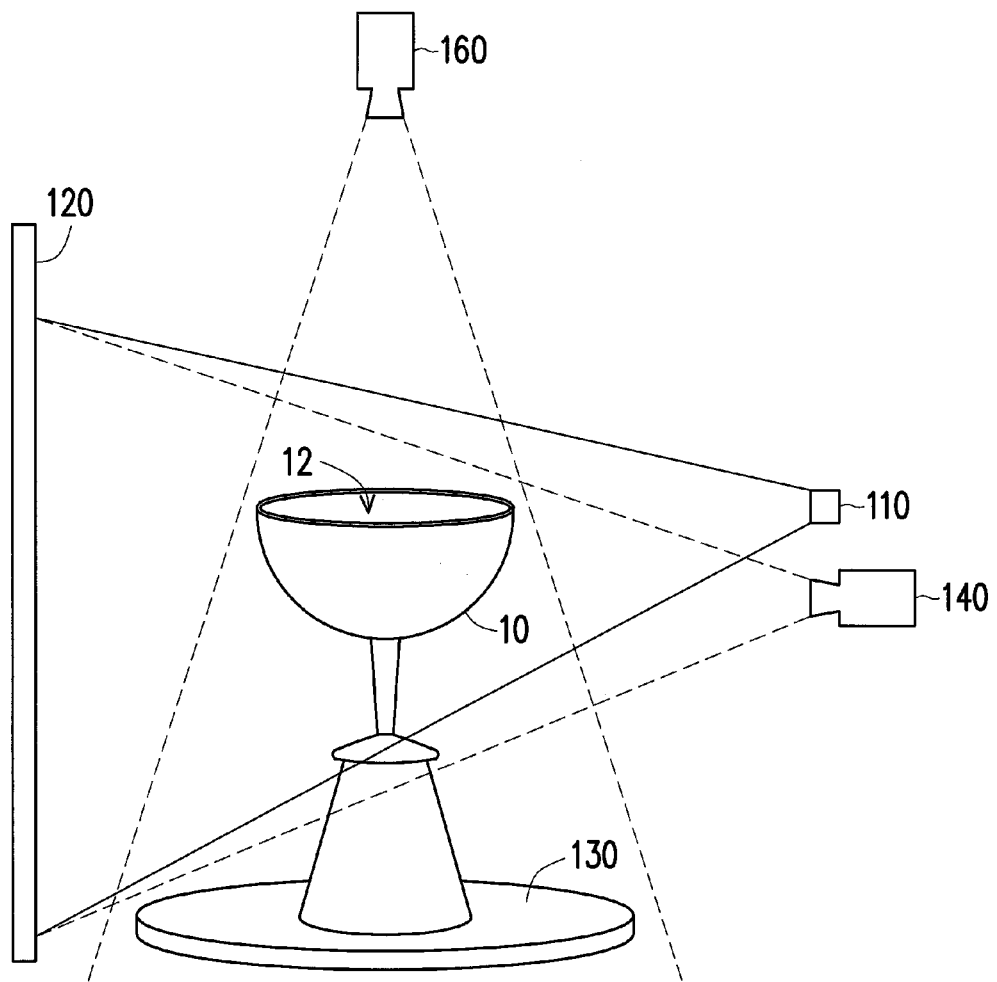
FIG. 3 is a schematic diagram of a part of components of a 3D scanner according to another embodiment of the invention.

FIG. 3 is a schematic diagram of a part of components of a 3D scanner according to another embodiment of the invention. It should be noticed that the 3D scanner 100 of the present embodiment is similar to the 3D scanner 100 of FIG. 2, and reference numbers of the components and a part of contents of the aforementioned embodiment are also used in the present embodiment, where the same reference numbers denote the same or like components, and descriptions of the same technical contents are omitted. The aforementioned embodiment can be referred for descriptions of the omitted parts, and detailed descriptions thereof are not repeated in the present embodiment. Differences between the 3D scanner 100 of the present embodiment and the 3D scanner 100 of FIG. 2 are described below.

Referring to FIG. 1 and FIG. 3, in the present embodiment, the 3D scanner 100 further includes an auxiliary image capturing unit 160 coupled to the processing unit 150. The 3D object 10 has a recess portion 12 recessed towards the central axis of the 3D object 10, and the auxiliary image capturing unit 160 is configured to face the recess portion 12 as shown in FIG. 3, and capture a grey level image of the recess portion 12 for the processing unit 150 to read and process. In this way, the processing unit 150 can build the digital 3D model related to the 3D object 10 having the recess portion 12 according to the object contour images captured by the image capturing unit 140 and the grey level image captured by the auxiliary image capturing unit 160. For example, if the recess portion 12 is located at a top surface of the 3D object 10, and the image capturing unit 140 faces the screen 120 as shown in FIG. 3, the image capturing unit 140 cannot effectively capture the grey level image of the recess portion 12. Herein, the auxiliary image capturing unit 160 configured to face a carrying surface of the rotary platform 130 and face the recess portion 12 can capture the grey level image of the recess portion 12 for the processing unit 150 to read and process. In this way, the processing unit 150 can build the digital 3D model related to the 3D object 10 having the recess portion 12 according to the object contour images captured by the image capturing unit 140 and the grey level image captured by the auxiliary image capturing unit 160.

Figure 4:
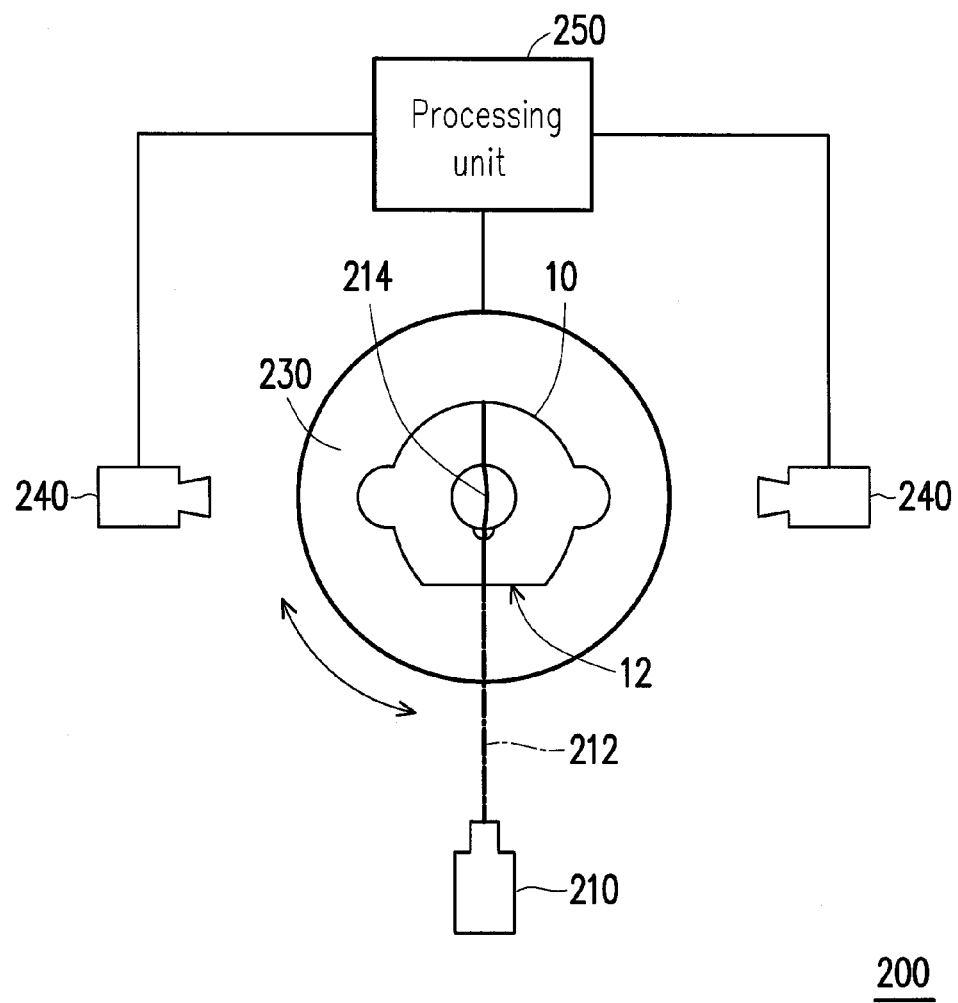
FIG. 4 is a schematic diagram of 3D scanner according to another embodiment of the invention.
Figure 5:
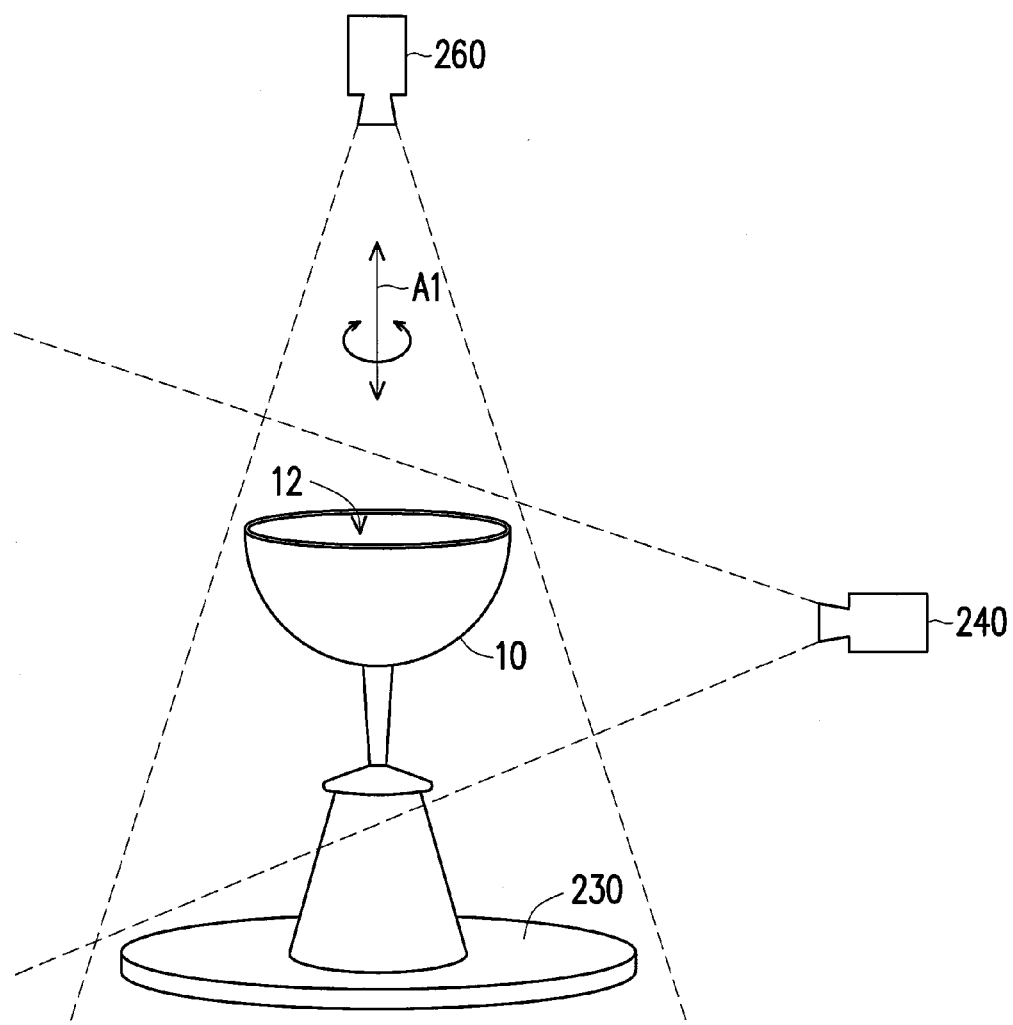
FIG. 5 is a schematic diagram of a part of components of a 3D scanner according to another embodiment of the invention.

FIG. 4 is a schematic diagram of 3D scanner according to another embodiment of the invention. FIG. 5 is a schematic diagram of a part of components of a 3D scanner according to another embodiment of the invention. It should be noticed that the 3D scanner 200 of the present embodiment is similar to the 3D scanner 100 of FIG. 2, and reference numbers of the components and a part of contents of the aforementioned embodiment are also used in the present embodiment, where the same reference numbers denote the same or like components, and descriptions of the same technical contents are omitted. The aforementioned embodiment can be referred for descriptions of the omitted parts, and detailed descriptions thereof are not repeated in the present embodiment. Referring to FIG. 4 and FIG. 5, the 3D scanner 200 of the present embodiment is adapted to build a digital 3D model related to the 3D object 10. Moreover, the 3D scanner 200 can also be coupled to a 3D printing apparatus, and the 3D printing apparatus reads the digital 3D model and builds, for example, a sample of the 3D object 10 according to the digital 3D model. The 3D scanner 200 of the present embodiment includes a light source module 210, a rotary platform 230, at least one image capturing unit 240 and a processing unit 250. In the present embodiment, the light source module 210 is used for emitting a plurality of beams, and the beams together form a planar lighting curtain 212. In detail, in the present embodiment, the light source module 210 is a laser light source module, and emits plurality of laser beams to form a planar laser lighting curtain. The rotary platform 230 is used for carrying the 3D object 10, and the 3D object 10 is located on a transmission path of the planar lighting curtain 212 to block the transmission of the laser beams, such that a light contour 214 is formed on a surface of the 3D object 10.

The rotary platform 230 is adapted to rotate the 3D object 10 to a plurality of orientations about a rotating axis A1, and the laser beams irradiate the 3D object 10 and form a plurality of light contours 214 of the 3D object 10 respectively corresponding to the orientations on the surface of the 3D object 10. While the rotary platform rotates the 3D object 10, the image capturing unit 240 captures the light contours 214 to obtain a plurality of light contour images. The processing unit 250 is coupled to the image capturing unit 240 and is configured to read and process the light contour images to build a digital 3D model related to the 3D object 10 according to the light contour images. In the present embodiment, the number of the image capturing units 240 can be plural, and the image capturing units 240 are symmetrically disposed at two opposite sides of the planar lighting curtain 212, so as to capture the light contour images with different angles. Moreover, the image capturing unit 240 is, for example, a monochromatic image capturing unit, i.e. the obtained object contour image is black and white image, so as to mitigate a loading of the processing unit 250 in performing image processing and calculation. The processing unit 250 may further obtain a corresponding light contour line according to a maximum grey level difference of each of the light contour images, and built the digital 3D model according to the light contour lines.

In detail, the processing unit 250 is coupled to the rotary platform 230, and controls the rotary platform 230 to rotate the 3D object 10 to a plurality of orientations about the rotating axis A1. Further, the processing unit 250 can control the rotary platform 230 to rotate a plurality of predetermined angles about the rotating axis A1 sequentially, so as to rotate the 3D object 10 to the aforementioned orientations. In this way, each time the rotary platform 230 rotates the 3D object by the predetermined angle, the planar lighting curtain 212 forms a light contour on the surface of the 3D object 10, and the image processing unit 240 captures the light contour to obtain a light contour image. The above step is repeated to obtain the light contour images of the 3D object 10 at various angles, and the processing unit 250 is used to convert the light contour images into the light contour lines in plane coordinates, and correspond the light contour lines to the coordinates of the orientations, so as to build the digital 3D model related to the 3D object 10.

Similar to the aforementioned embodiment, in the present embodiment, a sum of the predetermined angles by which the processing unit 250 controls the rotary platform 230 to rotate about the rotating axis A1 is 180 degrees. Namely, each time the rotary platform 130 rotates the 3D object 10 by the predetermined angle until the 3D object 10 is totally rotated by 180 degrees. Therefore, in case that the central axis of the 3D object 10 substantially coincides with the rotating axis A1 of the rotary platform 230, an initial light contour image of the 3D object 10 corresponding to an initial orientation on the rotary platform 230 substantially coincides with a final light contour image of the 3D object 10 corresponding to a final orientation rotated by 180 degrees.

However, in an actual application, the central axis of the 3D object 10 probably cannot perfectly coincide with the rotating axis A1 of the rotary platform 230 and may have deviation. Therefore, the initial light contour image of the 3D object 10 corresponding to the initial orientation on the rotary platform 230 cannot substantially coincide with the final light contour image corresponding to the final orientation of the 3D object 10 on the rotary platform 230 rotated by 180 degrees. In this case, the processing unit 250 can compare the initial light contour image with the final light contour image to obtain a real light contour image of the 3D object 10 in such orientation, and obtain a real central axis of the light contour images.

Similar to the aforementioned embodiment, if the 3D object 10 has a recess portion 12 recessed towards the central axis of the 3D object 10, the image capturing unit 240 may further capture a grey level image of the recess portion 12, and the processing unit 250 reads and processes the grey level image, and builds a digital 3D model related to the 3D object 10 having the recess portion 12 according to the light contour images of the 3D object 10 in various angles and the grey level image of the recess portion 12. In detail, when the 3D object 10 is rotated to a position where the recess portion 12 faces the image capturing unit 240, the processing unit 250 controls the image capturing unit 240 to capture the grey level image of the recess portion 12, so as to obtain image information of the recess portion 12, and the processing unit 250 can deduce the structure information of the recess portion 12 according to the grey level image, and build the digital 3D model related to the 3D object 10 having the recess portion 12 according to the object contour images of the 3D object 10 in different angles and the grey level image of the recess portion 12.

Besides, in the embodiment of FIG. 5, the 3D scanner 200 may include an auxiliary image capturing unit 260 coupled to the processing unit 250. The 3D object 10 has a recess portion 12 recessed towards the central axis of the 3D object 10, and the auxiliary image capturing unit 260 is configured to face the recess portion 12 as shown in FIG. 5, and captures a grey level image of the recess portion 12 for the processing unit 250 to read and process. In this way, the processing unit 250 can build the digital 3D model related to the 3D object 10 having the recess portion 12 according to the light contour images captured by the image capturing unit 240 and the grey level image captured by the auxiliary image capturing unit 260. For example, if the recess portion 12 is located at a top surface of the 3D object 10, and the image capturing unit 240 faces the 3D object 10 along a direction perpendicular to the rotating axis A1 as that shown in FIG. 5, the image capturing unit 240 cannot effectively capture the grey level image of the recess portion 12. Herein, the auxiliary image capturing unit 260 configured to face the recess portion 12 along a direction parallel to the rotating axis A1 can capture the grey level image of the recess portion 12 and provide the grey level image of the recess portion 12 for the processing unit 250 to read and process. In this way, the processing unit 250 can build the digital 3D model related to the 3D object 10 having the recess portion 12 according to the light contour images captured by the image capturing unit 240 and the grey level image captured by the auxiliary image capturing unit 260.

Figure 6:
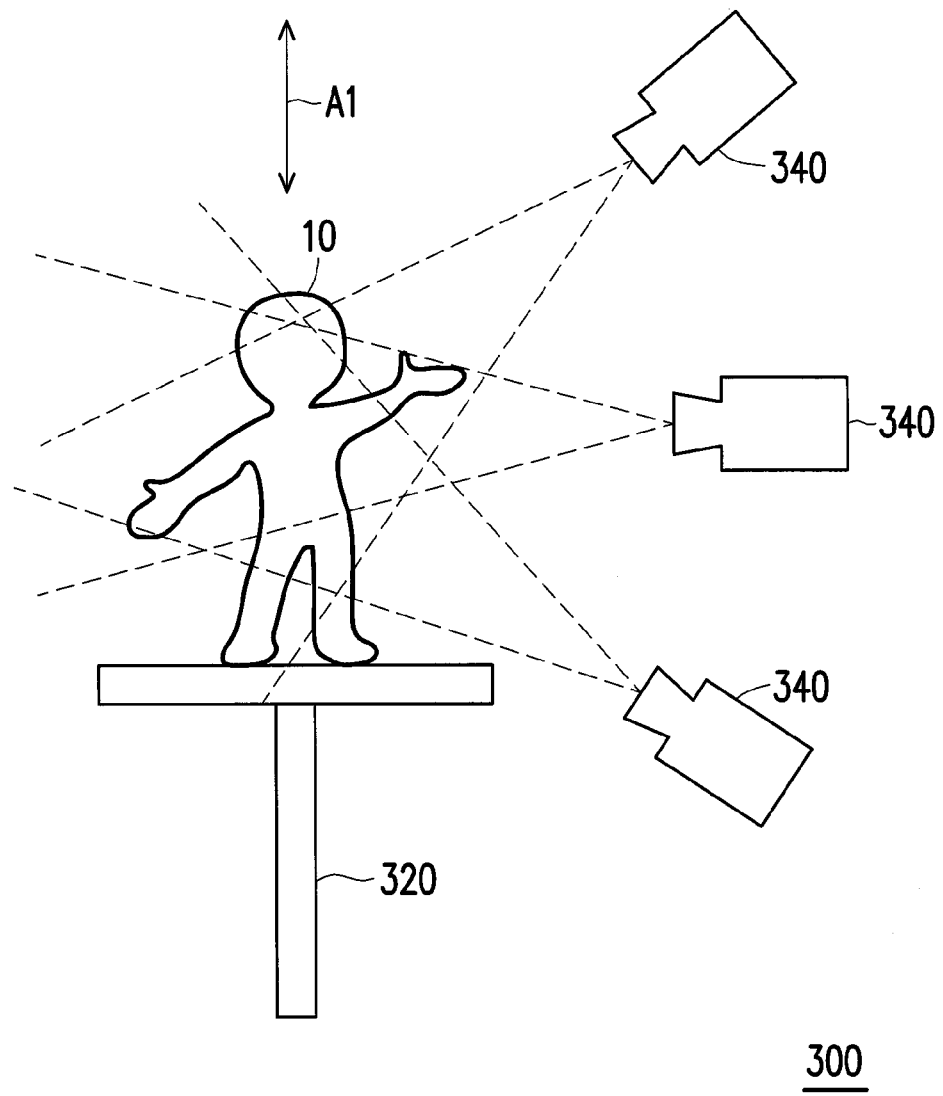
FIG. 6 is a schematic diagram of a 3D scanner according to another embodiment of the invention.

FIG. 6 is a schematic diagram of a 3D scanner according to another embodiment of the invention. In the present embodiment, the 3D scanner 300 is also adapted to build a digital 3D model related to the 3D object 10. The 3D scanner 300 is, for example, coupled to a 3D printing apparatus, and the 3D printing apparatus reads the digital 3D model and builds, for example, a sample of the 3D object 10 according to the digital 3D model. The 3D scanner 300 of the present embodiment includes a rotary platform 320, a plurality of image capturing units 340 and a processing unit. The processing unit can be coupled to and control the rotary platform 320 and the image capturing units 340. In the present embodiment, the 3D object 10 is disposed on the rotary platform 320, and the rotary platform 320 is configured to rotate the 3D object 10 to a plurality of orientations about the rotating axis A1. In this way, each time when the rotary platform 320 rotates the 3D object 10 by a predetermined angle, the image capturing units 340 simultaneously capture a plurality of object images of the 3D object 10 with different angles. The above step is repeated until the 3D object 10 is totally rotated by 180 degrees and the object images of the 3D object 10 at various angles are obtained, the processing unit, for example, calculates 3D coordinates of the object images in a common viewing area of the image capturing units 340 by using an image processing technique, so as to build the digital 3D model related to the 3D object 10 according to the object images.

In the present embodiment, the image capturing units 340 can be cameras using a CCD lens for capturing the object images of the 3D object 10. Moreover, the image capturing units 340 are, for example, chromatic image capturing units, i.e. the obtained object images are multicolored images. Of course, the invention is not limited thereto. In other embodiments, the image capturing units 340 may also be monochromatic image capturing units, i.e., the obtained object contour image is black and white image, so as to mitigate a loading of the processing unit in performing image processing and calculation.

In summary, the 3D object is disposed on the rotary platform of the 3D scanner for rotating the 3D object about a rotating axis, and when the 3D object is rotated, a light source irradiates the 3D object to project the shadow of the 3D object onto the screen, or a collimated light source directly irradiates the 3D object to form light contours on the surface of the 3D object to obtain contours from different angles of the 3D object, and the image capturing unit is used to capture the contour images from different angles, and then the processing unit is used to build a digital 3D model related to the 3D object according to the contour images. In this way, since the processing unit is only required to process the contour information of the 3D object, a loading of the processing unit in performing image processing and calculation is greatly mitigated, and efficiency for the 3D scanner building the digital 3D model is improved. Moreover, component configuration of the 3D scanner in the present invention is rather simple, so that a production cost is reduced.

Besides, if the 3D object has a recess portion recessed towards the central axis of the 3D object, the 3D scanner may use the image capturing unit thereof or another auxiliary image capturing unit to capture a grey level image of the recess portion, such that the processing unit can build the digital 3D model according to the object contours of the 3D object corresponding to different angles and the grey level image of the recess portion thereof, and the 3D scanner can precisely build the digital 3D model related to the 3D object having the recess portion.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional scanner, adapted to build a digital three-dimensional model related to a three-dimensional object, comprising:
   a light source module, configured to emit a beam;
   a screen, disposed on a transmission path of the beam, and having a projection surface facing the light source module;
   a rotary platform, configured to carry the three-dimensional object, and disposed between the light source module and the screen, wherein the rotary platform is configured to rotate the three-dimensional object to a plurality of orientations about a rotating axis, so as to form a plurality of object shadows of the three-dimensional object respectively corresponding to the orientations on the projection surface of the screen;
   an image capturing unit, configured to capture the object shadows from the projection surface of the screen to obtain a plurality of object contour images; and
   a processor, coupled to the image capturing unit, and configured to read and process the object contour images to build the digital three-dimensional model related to the three-dimensional object according to the object contour images, wherein the processor compares an initial object contour image corresponding to the three-dimensional object at an initial orientation of the rotary platform with a final object contour image corresponding to the three-dimensional object at a final orientation where the three-dimensional object is finally rotated to obtain a common central axis of the object contour images.

2. The three-dimensional scanner as claimed in claim 1, wherein the processor is coupled to the rotary platform, and controls the rotary platform to rotate the three-dimensional object to each of the orientations about the rotating axis, and the processor builds the digital three-dimensional model corresponding to the orientations according to the object contour images.

3. The three-dimensional scanner as claimed in claim 1, wherein the rotary platform rotates a plurality of predetermined angles sequentially about the rotating axis, so as to sequentially rotate the three-dimensional object to the orientations.

4. The three-dimensional scanner as claimed in claim 3, wherein a sum of the predetermined angles is 180 degrees.

5. The three-dimensional scanner as claimed in claim 1, wherein the relation between a size of the object shadow and a size of the three-dimensional object is in a fixed ratio.

6. The three-dimensional scanner as claimed in claim 5, wherein the fixed ratio is substantially greater than 1.

7. The three-dimensional scanner as claimed in claim 1, wherein the image capturing unit is a monochromatic image capturing unit.

8. The three-dimensional scanner as claimed in claim 1, wherein the processing processor obtains a plurality of object contour lines according to maximum grey level difference of the object contour images, and builds the digital three-dimensional model according to the object contour lines.

9. The three-dimensional scanner as claimed in claim 1, wherein the three-dimensional object has a recess portion recessed towards a central axis of the three-dimensional object, the image capturing unit captures a grey level image of the recess portion, and the processing processor builds the digital three-dimensional model related to the three-dimensional object according to the object contour images and the grey level image.

10. The three-dimensional scanner as claimed in claim 1, further comprising an auxiliary image capturing unit coupled to the processor, wherein the three-dimensional object has a recess portion recessed towards a central axis of the three-dimensional object, the auxiliary image capturing unit is configured to face the recess portion and capture a grey level image of the recess portion, and the processor builds the digital three-dimensional model related to the three-dimensional object according to the object contour images and the grey level image.

* * * * *